United States Patent [19]

Griscom

[11] 3,917,717
[45] Oct. 4, 1975

[54] PREPARATION OF ETHERS OF A PHENOL AND AN ALKYL POLYOL

[75] Inventor: Richard William Griscom, Morristown, Tenn.

[73] Assignee: Syntex (U.S.A.) Inc., Palo Alto, Calif.

[22] Filed: Dec. 6, 1973

[21] Appl. No.: 422,183

Related U.S. Application Data

[63] Continuation of Ser. No. 201,180, Nov. 22, 1971, abandoned.

[52] U.S. Cl........... 260/613 D; 260/609 R; 260/620; 260/621 P; 260/623 R; 260/624 R; 424/341
[51] Int. Cl.$^2$......................................... C07C 43/20
[58] Field of Search.................... 260/613 D, 609 R

[56] References Cited
UNITED STATES PATENTS

2,075,018   3/1937   Bruson et al.................... 260/613 D
2,351,024   6/1944   Evans et al. .................... 260/613 D Primary Examiner—Joseph E. Evans
Assistant Examiner—Nicky Chan
Attorney, Agent, or Firm—Lawrence S. Squires; William B. Walker

[57] ABSTRACT

Crystalline ethers of phenols and alkyl polyols are prepared from an alkali metal phenate and a halohydrin by a process wherein one solvent mixture is used in the azeotropic dehydration of the phenate, as a medium in the reaction of the phenate with the halohydrin and as a crystallization solvent for the product. Highly pure ethers are obtained in good yield.

5 Claims, No Drawings

PREPARATION OF ETHERS OF A PHENOL AND AN ALKYL POLYOL

This is a continuation of application Ser. No. 201,180 filed Nov. 22, 1971 now abandoned

BACKGROUND OF THE INVENTION

This invention relates to the preparation of aromatic ethers of polyhydroxy alcohols. Several of these have found use in the medical arts, including both human and veterinary practice, and in cosmetology. Glyceryl guaiacolate or 3-($o$-methoxyphenoxy)-1,2-propanediol and 3-($o$-toloxy)-1,2-propanediol have, for example, been found to exhibit muscle relaxing properties when administered to man and animal alike. The former is well known as an expectorant, also. The cosmetics industry uses 3-(p-chlorophenoxy)-1,2-propanediol in some of its preparations.

The preparation of hydroxyalkyl ethers of phenols has been investigated for many years by chemists striving to achieve the not always compatible goals of improved yields, higher purity and economy. The reaction usually employed is the condensation of a phenol with a halohydrin in the presence of an alkali metal hydroxide or alkoxide. The reaction of phenol with ethylene chlorohydrin, for example, is illustrated by the equation:

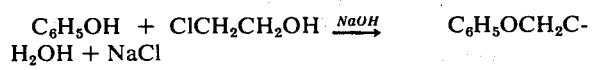

An alkali metal phenate is probably formed as an intermediate. The process of this invention employs this reaction advantageously to obtain a highly pure ether in commercially feasible yields.

A former method of preparing these phenol ethers is to conduct the reaction in a water solution. The large amount of water required, however, causes large losses of the halohydrin used because of the hydrolysis thereof. Furthermore, the water carries unwanted halide salts with it into the final product and the removal of these is very difficult. To overcome this problem some investigators have used ethanolic solutions of sodium ethoxide (J. Am. Chem. Soc., 72 3710 (1950)). A disadvantage of such a process on a commercial scale is the care with which sodium ethoxide must be handled. The process of this invention overcomes the salt problem without such a disadvantage.

One alternative which has been offered is the use of an anhydrous sodium phenate, prepared by the azeotropic distillation of the water from an aqueous solution of the phenate with toluene, in the condensation with a chlorohydrin (British Pat. No. 788,278). Special procedures are needed in such a method to prevent caking of the sodium phenate during the final stages of dehydration and excess reactants and by-products must be removed from the condensation product by either steam distillation or repeated crystallizations.

The process of this invention is particularly well adapted to the preparation of highly pure glyceryl guaiacolate. Using the sharpness of the melting point as a standard of purity, the glyceryl guaiacolate produced by this process without recrystallization is purer than that produced by the prior art processes with recrystallization. The product of the process described in Czech Pat. No. 107,107 wherein an aqueous solution of the crude glyceryl guaiacolate is azeotropically dried by distillation with a single organic solvent, which also serves as a crystallization medium, melts between 78°–82°C. An alcoholic medium is employed in the process of Czech Pat. No. 109,881 to give glyceryl guaiacolate melting between 77°–80°C.

THE INVENTION

The process of this invention whereby highly pure ethers of a phenol and a polyol are obtained by a single crystallization utilizes a benzenoid solvent/alkanol mixture throughout the entire process, that is, during dehydration of an alkali metal phenate, reaction of the alkali metal phenate with a haloydrin and crystallization of the resulting ether.

An object of this invention, therefore, is to provide a process for the preparation of a highly pure crystalline ether of a phenol and a polyol without the need of recrystallization.

Another object is to provide a process wherein a crystalline ether is both prepared and purified with the aid of the same solvent mixture.

Another object is to provide a process for the preparation of an ether from an alkali metal phenate and a halohydrin wherein the solvent mixture employed functions as a component in the azeotropic distillation of water from the reaction mixture, as a solvent (along with a minimal amount of water) for the alkali metal phenate and as a solvent for the crystallization of the ether.

These and other objects will become apparent from the following description of the invention.

Stated broadly, this invention is a process for the preparation of a crystalline ether of a phenol and an alkyl polyol comprising the steps of dehydrating an aqueous solution of a phenol and an alkali metal base by azeotropic distillation with a mixture of a monocyclic benzenoid solvent (i.e., benzene, alkyl benzenes and alkoxy benzenes) having from 6 to 10 carbon atoms, inclusive, and an alkanol having from 4 to 8 carbon atoms, inclusive reacting the resulting alkali metal phenate with a halohydrin at the reflux temperature of the mixture; and crystallizing the ether from the resulting mixture.

The benzenoid solvents contemplated in this invention include hydrocarbons such as benzene, toluene, xylenes, ethylbenzene, cumene, mesitylene, cymene, diethylbenzene, butylbenzene, and phenyl ethers such as anisole. A solvent selected from the class consisting of benzene, toluene, and the xylenes is preferred because of the lower boiling points thereof; of these, toluene and the xylenes are preferred because of the lower toxicity thereof.

Among the alkanols contemplated in this invention are n-butanol, sec-butanol, isobutanol, and mixtures thereof. Other examples of the alkanols include the pentanols, hexanols, heptanols and octanols. These may be either straight chained or branched chained, for example: n-octanol and 2-ethylhexanol-1. Preferably, the alkanol will be at least one of the group consisting of n-butanol, sec-butanol and isobutanol.

A particularly preferred combination for the solvent mixture is toluene and a butanol, especially n-butanol.

The ratio of the benzenoid solvent to the alkanol in the solvent mixture may be from about 90:10 to about 10:90 by volume. Mixtures in which the benzenoid solvent is the major component are preferred, however, in order to minimize the losses of the halohydrin reactant caused by the reaction of the alkanol therewith. For this reason a ratio of 90 parts by volume of the benzenoid solvent to 10 parts of alkanol is most preferred although good results may be obtained with volume ratios within the range of about 80:20 to about 60:40.

The phenol is represented by the folmula:

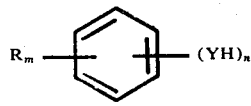

wherein R is an alkyl or alkoxy radical having from 1 to 4 carbon atoms, a halogen radical or a phenyl radical; Y is oxygen or sulfur, $m$ is from 0 to 5, $n$ is from 1 to 3, and $m + n$ is not greater than 6. Preferably, the phenol will contain only one free hydroxyl group because of the sensitivity of those having more than one to the oxygen in the air. Those having about 12 or less carbon atoms are also preferred. Usually the phenol will have about 10 or less and, most often, 8 or less carbon atoms. The preferred halogenated phenols have no more than about 2 halogen substituents and, most often, only one. Chlorine is the preferred halogen substituent. The alkoxy phenols are most preferred.

Examples of phenols contemplated in this invention include phenol, thiophenol, cresol, p-(t-butyl) phenol, chlorophenol, thiocresol, phenylphenol, ethoxyphenol and methoxyphenol.

The polyol moiety of the ethers prepared by this process may be derived from a di-, tri-, or higher-hydroxy alkanol (e.g., mannitol). The reactant which supplies this moiety to the ether is the α-mono-halohydrin corresponding to the polyol. For the purposes of this application, the terms halohydrin, chlorohydrin, bromohydrin, etc. are taken to mean those polyols in which one of the hydroxyl radicals has been replaced by a chloro-, bromo-, or other halogen radical.

The α-mono-halohydrins will usually contain no more than about 5 and, preferably, 3 or less, hydroxyl radicals. The number of carbon atoms will usually be 6 or less and preferably, 4 or less. Most often, this number will be 2 or 3. The preferred halohydrins are the chlorohydrins and bromohydrins, although the corresponding fluorine and iodine compounds may also be used.

The α-mono-halohydrins of ethylene glycol; propylene glycol; isobutylene glycol; glycerol; 2-methyl-1,2,3-propanetriol; 1,2-dimethyl-1,2,3-propanetriol; 1-methyl-1,2,3-propanetriol; mannitol; and sorbitol are examples of the reactant which supplies the polyol moiety of the ether.

The stoichiometric quantities of the halohydrin and the phenol which are required to give the desired product are preferably used in order to reduce the amount of impurities in the product. For example, one mole of a dihydroxy benzene will react with two moles of a halohydrin to form a bis-ether.

The alkali metal base used to prepare the corresponding phenate may be lithium, sodium, or potassium hydroxide.

The alkali metal base and the phenol are placed in a mixture of water and the benzenoid solvent/alkanol mixture and then the mixture is dehydrated by an azeotropic distillation in which the benzenoid solvent/alkanol component is constantly returned to the reaction vessel after separation of the water. The distillation is continued until substantially all of the solvent water is removed. Care should be taken at this point to avoid the precipitation of the alkali metal phenate. In cases where this precipitation does occur, the addition of the halohydrin may be commenced at the first indication of precipitation. In some cases as much as about 10 mole percent of the water formed by the reaction of an alkali metal hydroxide and a phenol may be removed in addition to the solvent water before precipitation begins.

The halohydrin is added to the substantially dehydrated solution of the alkali metal phenate and the removal of the remaining water is completed.

The reflux temperature of the mixture is defined for the purpose of describing this invention as the temperature at which refluxing of the benzenoid solvent/alkanol pair occurs. This will depend on the pressure within the distillation apparatus, the particular solvent mixture used and on the amount thereof. It will be understood that the reflux temperature may vary by several degrees in a given system because of variance in heat input and output which occur during the course of a process.

The weight of the solvent mixture will usually be from 1 to about 20 times the weight of the product to be obtained. Preferably, the ratio will be from about 2:1 to about 10:1 parts by weight and most often from about 4:1 to about 10:1.

The time allotted to the dehydration stage in this process is not critical. The reaction stage time may vary according to the temperature within the system, the reactants, solvents and pressure and is likewise not critical. The reaction of the halohydrin with the alkali metal phenate will often be complete within from about 1 to about 8 hours and move often within from about 2 to about 6 hours.

Upon completion of the reaction or at some desired point prior thereto the reaction mixture is acidified with an appropriate acid, e.g., hydrochloric acid, to liberate the phenol from any unreacted phenate and thereby avoid problems during the ensuing crystallization caused by an alkali metal phenate having only a slight solubility in the solvent mixture used. If water is introduced with the acid, it is then removed by azeotropic distillation again. Removal of substantially all of the water from the acidified reaction mixture is essential in order to obtain the best results. Product quality and yield is affected by the presence of water in the solvent mixture during the crystallization stage. The water also carries the alkali metal halide formed by the condensation into the final product.

For best results an atmosphere of nitrogen or another inert gas should be maintained in the reaction vessel at all times until after the acidification step.

The alkali metal halide is then removed from the product solution and the product is crystallized. Separation of the crystals from the mother liquor may be accomplished by any suitable means, e.g., filtration or centrifugation. The mother liquor may be concentrated to produce a second crop of crystals for recycling to a dry solution of a subsequent batch of product.

DESCRIPTION OF THE PREFERRED EMBODIMENTS

The following examples are illustrative of the practice and the advantages of this invention. All parts are by weight unless otherwise noted.

EXAMPLE I

A reactor equipped with a condenser and a water trap is charged with 159 parts of toluene, 17 parts of n-butanol and 8.5 parts (0.213 mole) of sodium hydroxide in 33 parts of distilled water. A stream of nitrogen is passed through the mixture as it is heated to reflux to displace the air in the system. Guaiacol, 25 parts (0.202 mole) is then added and the mixture is heated to its reflux temperature of 88° – 98°C. for about 4.5 hours to azeotropically distill 32 parts of water from the mixture. The toluene and n-butanol are continuously returned to the reactor from the water trap in which the water is separated. Then 22.25 parts (0.201 mole) of glycerol chlorohydrin (3-chloro-1,2,-propanediol) are added at a pot temperature of about 90° – 95°C. The resulting mixture is then heated to reflux for about 4 hours with removal of the residual water. The mixture is then acidified to about pH 1 by the addition of one part of concentrated hydrochloric acid. The nitrogen purge is stopped. Then the mixture is dried by a final azeotropic distillation.

The mixture is filtered at about 60°C. to remove the sodium chloride formed by the reaction. The filtrate is heated to about 68°C. and then cooled to 40°C. during about 30 minutes and then held at 40°C. for about 25 minutes, while being stirred. The solution is seeded with about 0.1 part of glyceryl guaiacolate crystals to initiate crystallization. The temperature is held at 40°C. for about 30 minutes and then reduced to 6°C. in about 2 hours. The crystalline mass is centrifuged to expel the mother liquor and is washed with about 15 parts of cold toluene. The yield of dry glyceryl guaiacolate is 28.75 parts (about 72.2% of theory, based on guaiacol charged.) The product melts at 80° – 81°C.

EXAMPLE II

To a reactor equipped with a condenser and a water trap there is charged an aqueous solution of sodium hydroxide (126 parts (3.15 moles) NaOH in 480 parts water), 2700 mls. toluene and 300 mls. n-butanol and the mixture is heated to boiling while being purged with nitrogen. Then 372 parts (3.0 moles) of guaiacol are added at 50°C. and the mixture is heated to 94° – 85°C. to distill a toluene/n-butanol/water azeotrope. The toluene and n-butanol are returned to the reactor continuously while 480 mls. of water are collected in the trap. The mixture is cooled to just below reflux temperature and glycerol chlorohydrin, 330 parts (2.99 moles), is then added and refluxing is resumed. The residual water is removed while the heating is continued for 4 hours at a pot temperature of about 105°C. The mixture is cooled to 50°C., acidified to pH 1 with concentrated hydrochloric acid, azeotropically dried again, and filtered at 50°C.

The hot filtrate is combined with a solution, at room temperature, of about 64 parts of a second crop of glyceryl guaiacolate crystals from a previous batch in about 320 mls. of a 90:10 (by volume) toluene/n-butanol mixture. The combined solutions are then stirred and cooled to about 35°C – 40°C. Crystallization begins without seeding. The temperature is maintained for about 30 minutes and then cooling is resumed until a temperature of about 5° – 10°C. is reached. After about 30 minutes at this temperature the slurry of crystals is filtered and the crystals washed with 250 mls. of cold toluene. A recovery of 509 parts of dry glyceryl guaiacolate is achieved. This is about 85% of the theoretical yield which includes recycled second crop. The product has a melting point of 80° – 81°C. (corrected.)

The process of this invention may also be practiced by substituting a mixture of butanol isomers for the n-butanol in the above examples. Glycerol bromohydrin may also be used in place of the chlorohydrin in these examples.

Although certain preferred embodiments of the invention have been disclosed for purposes of illustration it will be evident that various changes and modifications can be made therein without departing from the spirit and scope of this invention.

What is claimed is:

1. A process for preparing a crystalline ether having the formula:

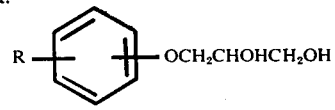

wherein R is an alkoxy radical having from one to four carbon atoms;
which consists essentially of the sequential steps of:
a. providing a reaction mixture consisting essentially of an alkoxyphenol, having the same alkoxy radical as said crystalline ether; an alkali metal hydroxide; water; toluene; and n-butanol and wherein the volume ratio of toluene to n-butanol is from about 60:40 to about 90:10;
b. refluxing and azeotropically distilling said reaction mixture to form the corresponding alkali metal alkoxy phenate and concomitantly remove a quantity of water equal to about from all of the water in the original reaction mixture to all of the water in the original reaction mixture plus up to 10 mole percent of the water formed by the reaction of said alkoxphenol and said sodium hydroxide while returning the toluene and water butanol to the reaction mixture;
c. combining an amount of a halohydrin, selected from the group consisting of glycerol chlorohydrin and glycerol bromohydrin, stoichiometrically equivalent to the amount of said alkoxphenol with the product mixture of step (b), and refluxing an azeotropically distilling the resulting mixture, to form the corresponding 3alkoxyphenoxy-1,2-propane-diol and dehydrate the mixture while returning the toluene and n-butanol to the reaction mixture;
d. acidifying the product mixture of step (c) to consume any unreacted alkoxyphenate and azeotropically distilling the acidified mixture to remove any water added during the acidification while returning the toluene and n-butanol to the reaction mixture;
e. removing solid alkali metal halide from the product mixture of step (d); and
f. crystallizing the resulting ether from the liquid product mixture of step (e) comprising toluene and n-butanol and recovering said crystalline ether.

2. The process of claim 1 wherein said alkali metal hydroxide is sodium hydroxide.

3. The process of claim 1 wherein the phenol is guaiacol and the halohydrin is glycerol chlorohydrin.

4. The process of claim 3 wherein said alkali metal hydroxide is sodium hydroxide.

5. The process of claim 1 wherein the ratio of toluene to n-butanol is about 90:10 by volume.

* * * * *

UNITED STATES PATENT AND TRADEMARK OFFICE
CERTIFICATE OF CORRECTION

PATENT NO. : 3,917,717
DATED : November 4, 1975
INVENTOR(S) : RICHARD WILLIAM GRISCOM It is certified that error appears in the above-identified patent and that said Letters Patent are hereby corrected as shown below:

Page 1 [45], "Oct. 4, 1975" should read -- Nov. 4, 1975 --.

Col. 1, line 64, "with" should read -- without --.

Col. 3, line 4, "folmula" should read -- formula --.

Col. 5, line 37, "85°C." should read -- 95°C. --.

Col. 6, Claim 1, line 35, "water" should read -- n- --.

Col. 6, Claim 1, line 41, "an" should read -- and --.

Col. 6, Claim 1, line 43, "3alkoxyphenoxy-" should read 3-alkoxyphenoxy- --.

Signed and Sealed this tenth Day of February 1976

[SEAL]

Attest:

RUTH C. MASON
*Attesting Officer*

C. MARSHALL DANN
*Commissioner of Patents and Trademarks*